(12) United States Patent
Scantlebury et al.

(10) Patent No.: US 9,382,028 B2
(45) Date of Patent: Jul. 5, 2016

(54) OPAQUE POLYESTER CONTAINERS

(75) Inventors: Geoffrey R. Scantlebury, Charlotte, NC (US); Zhenguo Liu, Greer, SC (US); Xiaoyan Huang, Spartanburg, SC (US)

(73) Assignee: Invista North America S.A.R.L., Charlotte, NC (US)

( * ) Notice: Subject to any disclaimer, the term of this patent is extended or adjusted under 35 U.S.C. 154(b) by 1685 days.

(21) Appl. No.: 10/503,549

(22) PCT Filed: Jan. 31, 2003

(86) PCT No.: PCT/US03/03042
§ 371 (c)(1),
(2), (4) Date: Jul. 30, 2004

(87) PCT Pub. No.: WO03/064267
PCT Pub. Date: Aug. 7, 2003

(65) Prior Publication Data
US 2005/0089658 A1   Apr. 28, 2005

Related U.S. Application Data

(60) Provisional application No. 60/353,265, filed on Feb. 1, 2002.

(51) Int. Cl.
*B32B 27/34* (2006.01)
*B65D 1/02* (2006.01)
*C08L 67/02* (2006.01)
*B29B 11/08* (2006.01)
*B29B 11/14* (2006.01)
*B29C 49/00* (2006.01)
*B29C 49/06* (2006.01)
*B29K 67/00* (2006.01)
*B29K 77/00* (2006.01)
*B29K 105/00* (2006.01)
*B29K 105/16* (2006.01)
*B29L 31/00* (2006.01)
*B65D 81/26* (2006.01)
*C08K 3/08* (2006.01)
*C08K 5/098* (2006.01)
*C08L 67/06* (2006.01)
*C08L 77/00* (2006.01)

(52) U.S. Cl.
CPC .............. *B65D 1/0207* (2013.01); *C08L 67/02* (2013.01); *B29B 11/08* (2013.01); *B29B 11/14* (2013.01); *B29B 2911/1402* (2013.01); *B29B 2911/1404* (2013.01); *B29B 2911/14026* (2013.01); *B29B 2911/14033* (2013.01); *B29B 2911/1498* (2013.01); *B29B 2911/14106* (2013.01); *B29B 2911/14133* (2013.01); *B29C 49/0005* (2013.01); *B29C 49/06* (2013.01); *B29K 2067/00* (2013.01); *B29K 2077/00* (2013.01); *B29K 2105/005* (2013.01); *B29K 2105/0008* (2013.01); *B29K 2105/0011* (2013.01); *B29K 2105/0026* (2013.01); *B29K 2105/0032* (2013.01); *B29K 2105/0044* (2013.01); *B29K 2105/16* (2013.01); *B29K 2995/0025* (2013.01); *B29K 2995/0067* (2013.01); *B29L 2031/7158* (2013.01); *B65D 81/266* (2013.01); *C08G 2390/00* (2013.01); *C08K 3/08* (2013.01); *C08K 5/098* (2013.01); *C08L 67/06* (2013.01); *C08L 77/00* (2013.01); *Y10T 428/1352* (2015.01)

(58) Field of Classification Search
USPC .............. 428/36.6, 35.7, 36.8, 475.2; 525/58; 524/431; 220/669, 674; 526/292.2; 427/224, 255.23
See application file for complete search history.

(56) References Cited

U.S. PATENT DOCUMENTS

| | | | |
|---|---|---|---|
| 3,371,062 A | | 2/1968 | Curry |
| 4,051,265 A | * | 9/1977 | Kirshenbaum et al. ....... 426/107 |
| 4,427,122 A | | 1/1984 | Jakobsen |
| 4,643,925 A | * | 2/1987 | Smith et al. .................. 428/36.6 |
| 4,772,656 A | | 9/1988 | Tanner |
| 4,835,214 A | * | 5/1989 | Shepherd et al. ............... 525/58 |
| 5,021,515 A | | 6/1991 | Cochran et al. |
| 5,258,233 A | * | 11/1993 | Mills et al. .................... 428/480 |
| 5,529,833 A | * | 6/1996 | Speer et al. ................... 428/215 |

(Continued)

FOREIGN PATENT DOCUMENTS

| | | |
|---|---|---|
| GB | 2299965 | 10/1996 |
| WO | 93/15887 | 8/1993 |
| WO | 02/49923 | 6/2002 |

OTHER PUBLICATIONS

Murphy, Additives for Plastics Handbook, 2001, Elsevier Advanced Technology, 2nd, 396-397.*
R. Gachter and H. Muller, Eds., "Plastics Additives Handbook; Stabilzers, Processing Aids, Plasticizers, Fillers, Reinforcements, Colorants for Thermoplastics; $3^{rd}$ Edition", Munich: Hanser Publishers (1990), pp. 637-676.*

(Continued)

*Primary Examiner* — Ellen S Wood
(74) *Attorney, Agent, or Firm* — Clements Bernard, PLLC; Gregory N. Clements

(57) ABSTRACT

The present invention describes both a stretch-blow-molded opaque polyester container and a method of making it. The container, typically a beverage bottle has less than 15% transmission of visible light (500 nm) through a 0.4 millimeter wall thickness. It contains from about 0.1 to about 5 wt. % of said opacifying material. The opacifying material may be any material compatible with polyester resin. The method of making the container includes introducing the opacifying material during polymerization, or prepared as a master batch for mixing with the polymer. Selection of certain opacifying materials can also result in favorable reheat properties, gas permeation-barrier improvements, and when the resin contains both opacifying material and oxygen scavenger there can be a synergistic effect with respect to $CO_2$ permeation.

6 Claims, No Drawings

(56) References Cited

U.S. PATENT DOCUMENTS

| | | | | |
|---|---|---|---|---|
| 5,908,676 | A | * | 6/1999 | Otaki et al. ............... 428/35.4 |
| 5,961,914 | A | * | 10/1999 | Mannion et al. ............ 264/544 |
| 6,001,439 | A | * | 12/1999 | Kawakami et al. .......... 428/35.7 |
| 6,022,920 | A | * | 2/2000 | Maxwell et al. ............. 524/431 |
| 6,117,506 | A | | 9/2000 | Graboski |
| 6,565,938 | B1 | * | 5/2003 | Toyosumi et al. .......... 428/36.6 |
| 6,599,598 | B1 | * | 7/2003 | Tai et al. .................... 428/36.6 |
| 2003/0027912 | A1 | * | 2/2003 | Tung et al. .................. 524/430 |
| 2003/0047565 | A1 | * | 3/2003 | Oda et al. .................... 220/660 |

OTHER PUBLICATIONS

BASF Data Sheet for BASF Sicopal Blue K 6310 Color Additive, Nov. 2001.*

Sekelik et al.: Journal Science Polymer Science Part B: Polymer Physics, 1999, vol. 37, pp. 847-857; Wiley Periodicals, USA.

Qureshi et al.: Journal of Polymer Science Part B: Polymer Physics, 2000, vol. 38, pp. 1679-1686; Wiley Periodicals, USA.

Polyakova et al.: Journal of Polymer Science Part B: Polymer Physics, 2001, vol. 39, pp. 1889-1899, Wiley Periodicals, USA.

* cited by examiner

OPAQUE POLYESTER CONTAINERS

The present U.S. National Phase Application claims priority to International Application Number PCT/US03/03042 filed Jan. 31, 2003 and U.S. Provional Application, Patent Ser. No. 60/353,265 that was filed on Feb. 1, 2002.

BACKGROUND OF THE INVENTION

1. Field of the Invention

The present invention relates to stretch-blow-molded polyester containers that are opaque. In particular, the present invention relates to stretch-blow-molded opaque polyester containers that have superior barrier properties for oxygen, carbon dioxide, and visible light. More specifically, the present invention is designed to be opaque such that less than 15% transmission of visible light (500 nm) passes through a 0.4-millimeter sheet of container material. The opacifying material may be any material compatible with polyester resin. Generally, the finer the powder, the better the opacifying properties. Selection of certain opacifying materials can also result in favorable reheat properties, gas permeation—barrier improvements, and when the resin contains both opacifying material and oxygen scavenger there can be a synergistic effect with respect to $CO_2$ permeation.

2. Prior Art

Current stretch-blow-molded polyester containers are transparent. The industry demands transparent polyester containers because the consuming public strongly prefers to see all food items. When the polyester containers are employed as food grade containers for such things as beer, soft drinks, bottled water, baby food, catsup, mustard and mayonnaise containers, etc. it is psychological that the consuming public must see the food. This burden places many restrictions on the container. For example, when looking for a suitable barrier material as an additive for the polyester container, or an acetaldehyde or oxygen scavenging compound, for example, it is necessary to find compounds that do not cause haziness or discolor the clear bottle. Consequently, much research and development has gone into finding suitable barrier materials and scavenger materials which maintain the polyester container transparent.

U.S. Pat. No. 4,427,122 to Jakobsen discloses a dual layer coextruded blank in which one layer contains a pulverulent material that is impermeable to light or comparable radiation. This material may, for example, consist of a metal, for example aluminum powder. The blank is then blow-molded into a bottle using conventional techniques.

British Pat. 2,299,965 to McRoberts et al discloses the addition of particles to polyester resins used to make a bottle to present a different visual appearance, i.e. a "flitter" to give a sparkling effect. The aesthetically pleasing appearance means that the particles are easily visible to the naked eye. The bottle may be colored. Moreover the particles must be very shiny and reflective to give the sparkling effect.

U.S. Pat. No. 3,371,062 to Curry discloses the addition of aluminum powder into polypropylene to resist ultra violet and oxidative degradation. The resin was employed for making pipe, rope, or fiber. There is no mention of a bottle, not even a stretch-blow-molded bottle.

U.S. Pat. No. 4,772,656 to Tanner discloses the incorporation of aluminum powder in polyolefins to improve the barrier properties to the permeation of fluid hydrocarbons through the molded container walls. Containers for hydrocarbon fluids are usually injection molded. Tanner does not mention stretch-blow-molding.

U.S. Pat. No. 5,258,233 to Mills et al discloses the use of $TiO_2$ in thermoformed or injection molded trays as a colorant to improve the opaque whiteness of a blend of polyamide and a nucleating agent in a crystallized polyester film. This reference also discloses the importance of employing a clear, colorless resin for use in stretch-blow-molded bottles.

U.S. Pat. No. 5,021,515 to Cochran et al discloses the use of partially aromatic polyamide as an oxygen scavenger when used in a concentration of from about 4 to about 6% by wt., based on the weight of the resin.

There is a need in the industry to improve uniform, single layer stretch-blow-molded polyester containers that allow cost effective solutions for barrier materials, scavenger compounds, and more effect production processes that are substantially less burdensome than those process conditions necessary to keep a polyester container transparent. In none of the discussed patents is there a teaching to the use of opacifying materials in stretch-blow-molded polyester containers to mask the color formed by specific additives that are used in transparent containers for food packaging.

The present invention is an approach diametrically opposed to stretch-blow-molded polyester transparent containers that until now have always required clear, colorless containers.

SUMMARY OF THE INVENTION

The present invention seeks to make an opaque container that transmits visible light (500 nm) through the wall of less than 15% when the wall thickness is about 0.4 millimeters. This type of container would not be employed in today's market for food grade applicable stretch-blow-molded containers.

The use of stretch-blow-molded opaque polyester for making containers removes these transparent restrictions that limit the barrier material or acetaldehyde scavenging materials and allow for cost-effective solutions to the current limitations of producing transparent containers. For example, there is no need to limit the barrier materials which will keep the container transparent. Now, with an opaque polyester container one can consider all barrier materials, for example, blends of polyvinyl alcohol, polybutadienes, partially aromatic polyamides and iron powder and nanoparticles. In addition, one no longer has to consider crystallization retarders typically employed for the polyester transparent container art. Crystallization retarders minimize haziness due to crystallization. With the present container, haziness is no problem since it will not be seen or observed in an opaque container.

The materials used to make the polyester resin opaque generally reduce the coefficient of friction between containers made from these resins; this minimizes the sticking of containers together in packing and unpacking cartons of containers.

Moreover, additives that cause yellowness or haziness such as certain catyalsts or other compounds such as low molecular weight nitrogen containing compounds (which turn yellow during the production of polyester resin) which are effective acetaldehyde scavenger products, or oxygen scavengers that cause haziness or color formation, can now be employed because the yellowness and haziness will be masked. Lastly, the opaque polyester containers of the present invention can be recycled easily by filtration of the reclaimed polyester which will remove the opaque particles employed.

In the broadest sense, the present invention comprises an opaque polyester container having less than 15% transmission of visible light (500 nm) through about a 0.4 millimeter wall.

In the broadest sense, the present invention also comprises a stretch-blow-molded opaque polyester container employing as the opacifying material compatible with polyester resin. Generally the polyester resin contains from about 0.1 to about 5 wt. % of said opacifying material.

In the broadest sense, the present invention also comprises an opaque single layer stretch-blow-molded polyester container having improved gas barrier properties, compared with containers having no opacifying material.

In the broadest sense, the present invention also comprises an opaque single layer stretch-blow-molded polyester container having synergistic oxygen scavenging properties, compared with containers having no opacifying material and no oxygen scavenger.

DESCRIPTION OF THE PREFERRED EMBODIMENTS

Generally polyesters can be prepared by one of two processes, namely: (1) the ester process and (2) the acid process. The ester process is where a dicarboxylic ester (such as dimethyl terephthalate) is reacted with ethylene glycol or other diol in an ester interchange reaction. Because the reaction is reversible, it is generally necessary to remove the alcohol (methanol when dimethyl terephthalate is employed) to completely convert the raw materials into monomers. Certain catalysts are well known for use in the ester interchange reaction. In the past, catalytic activity was sequestered by introducing a phosphorus compound, for example polyphosphoric acid, at the end of the ester interchange reaction. Primarily the ester interchange catalyst was sequestered to prevent yellowness from occurring in the polymer. With the present invention, there is no need to worry about yellow polymer, as the polymer will be opaque. Accordingly, with the present invention there is less need to add a sequestering agent such as a phosphorus compound.

Then the monomer undergoes polycondensation and the catalyst employed in this reaction is generally an antimony or titanium compound. In the past, these catalysts were preferred because they generally did not easily degrade the resultant polymer. Again, with the present invention other catalysts may be considered which do have an adverse effect on the color of the polymer but, on the other hand, may improve the overall residence time such that the overall time for producing the polyester could be substantially reduced.

In the second method for making polyester, an acid (such as terephthalic acid) is reacted with a diol (such as ethylene glycol) by a direct esterification reaction producing monomer and water. This reaction is also reversible like the ester process and thus to drive the reaction to completion one must remove the water. The direct esterification step does not require a catalyst. The monomer then undergoes polycondensation to form polyester just as in the ester process, and the catalyst and conditions employed are generally the same as those for the ester process.

In summary, in the ester process there are two steps, namely: (1) an ester interchange, and (2) polycondensation. In the acid process there are also two steps, namely: (1) direct esterification, and (2) polycondensation.

Suitable polyesters are produced from the reaction of a diacid or diester component comprising at least 65 mole % terephthalic acid or $C_1$-$C_4$ dialkylterephthalate, preferably at least 70 mole %, more preferably at least 75 mole %, even more preferably at least 95 mole %, and a diol component comprising at least 65% mole % ethylene glycol, preferably at least 70 mole %, more preferably at least 75 mole %, even more preferably at least 95 mole %. It is also preferable that the diacid component is terephthalic acid and the diol component is ethylene glycol, thereby forming polyethylene terephthalate (PET). The mole percent for all the diacid component totals 100 mole %, and the mole percentage for all the diol component totals 100 mole %.

Where the polyester components are modified by one or more diol components other than ethylene glycol, suitable diol components of the described polyester may be selected from 1,4-cyclohexandedimethanol, 1,2-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol or mixtures of these, and the like. In general, these diols contain 2 to 18, preferably 2 to 8 carbon atoms. Cycloaliphatic diols can be employed in their cis or trans configuration or as mixture of both forms. Preferred modifying diol components are 1,4-cyclohexanedimethanol or diethylene glycol, or a mixture of these.

Where the polyester components are modified by one or more acid components other than terephthalic acid, the suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, bibenzoic acid, or mixtures of these and the like. In the polymer preparation, it is often preferable to use a functional acid derivative thereof such as the dimethyl, diethyl, or dipropyl ester of the dicarboxylic acid. The anhydrides or acid halides of these acids also may be employed where practical. These acid modifiers generally retard the crystallization rate compared to terephthalic acid.

Also particularly contemplated by the present invention is modified polyester made by reacting at least 85 mole % terephthalate from either terephthalic acid or dimethylterephthalate with any of the above comonomers.

In addition to polyester made from terephthalic acid (or dimethyl terephthalate) and ethylene glycol, or a modified polyester as stated above, the present invention also includes the use of 100% of an aromatic diacid such as 2,6-naphthalene dicarboxylic acid or bibenzoic acid, or their diesters, and a modified polyester made by reacting at least 85 mole % of the dicarboxylate from these aromatic diacids/diesters with any of the above comonomers.

Any opacifying material compatible with the polyester resin can be used; these include i) metal powders such as aluminum, copper, iron, zinc and tin; ii) metal oxides of aluminum, titanium, zinc, tin, zirconium and silicon; iii) silica, fumed silica, fumed alumina, iv) metal silicates of aluminum and calcium; v) carbonates, sulfides and sulfates of calcium, barium, zinc and magnesium; and vi) clays; and mixtures thereof. Generally the polyester resin contains from about 0.1 to about 5 wt. % of said opacifying material.

As stated previously, in the past it was often desired to produce the cleanest, clearest polymer so that the containers would be transparent. With the present invention, however, no such restriction is placed on the polymer additives. Therefore, the present invention can consider all types of compatible pigments, dyes, fillers, branching agents, reheat agents, anti-blocking agents, antioxidants, anti-static agents, biocides, blowing agents, coupling agents, flame retardants, fillers, heat stabilizers, impact modifiers, light stabilizers, lubricants, plasticizers, processing aids, other scavengers, and slip agents.

Upon completion of the production of the polyester resin, it is often desirable to subject the resin to a solid state polymerization process to increase the viscosity. Other methods of increasing the viscosity are also within the scope of the present invention, such as by maintaining the resin in the melt polycondensation stage until the viscosity increase by employing certain reactors. All these processes are known to those skilled in the art.

After solid state polymerization or otherwise increasing the viscosity, the resin of the present invention is typically heated and extruded into uniform, single layer preforms. The preforms are then heated to about 100-120° C. and blown-molded into a uniform, single layer containers at a stretch ratio of about 12.5. The stretch ratio is the stretch in the radial direction times the stretch in the length (axial) direction. Thus if a preform is blown into a container, it may be stretched about two times its length and stretched about six times is diameter giving a stretch ratio of twelve (2×6).

The advantages are numerous for the present invention such as:

(1) for injection molding, shorter injection molding times can occur because crystallization of the polyester during cooling is no longer a factor;

(2) during stretch blow molding, faster cycle times may be achieved because again crystallization during polyester cooling is no problem, and a higher concentration of reheat agents (and a broader class of materials such as carbon, iron, antimony and other metals) can be employed to reduce the time to reheat the preform (these additives in the past were limited by clarity of the container), in addition the additive itself can act as a reheat agent;

(3) the omission of crystallization retardants since the present invention does not worry about crystallization causing haziness, there is a cost advantage in omitting such compounds as isophthalic acid or additional diethylene glycol;

(4) the presence of opaque particles generally improve barrier and the opaque materials mask any color or haze problems encountered with the present invention;

(5) additionally, oxygen scavenging materials can also be added, which in the past made the polymer hazy, such as blends of polyvinyl alcohol, polybutadienes, partially aromatic polyamides and iron (which gave a red-brown color), as well as nanoparticles;

(6) the heat setting temperature can now be raised to improve the hot fill performance which in the past was limited by clarity such that one can now use or employ higher mold temperatures, or longer heat set times, or both;

(7) many acetaldehyde scavenger compounds cause yellowness, such as low molecular weight nitrogen containing compounds, and such compounds can now be used with opaque resin containers;

(8) the recycle of opaque polyester containers can still be successful because the opaque materials can easily be removed by simple filtration from the polymeric materials;

(9) opaque pigments can be employed for particular applications such as aluminum pigments for beer (creating the appearance of an aluminum can) or $TiO_2$ for milk which creates a white container; and

(10) the process for making polyester, namely ester interchange and polycondensation, or direct esterification and polycondensation, can be improved by shorter residence times because poor color is no longer a factor with the present invention.

Suitable oxygen scavenging compounds for the present invention are: partially aromatic nylon such as MDX6 sold by Mitsubishi Gas Chemical Co., Inc. Type 6007; copolyesters containing polyolefin segments such as polybutadiene sold by BP Chemical as Amosorb DFC; ethylenically unsaturated hydrocarbons such as ethylene methyl acrylate cyclohexene sold by Chevron Phillips Chemical Company as EMCM resin Type OSP; and other oxidizable polymers. The addition of a transition metal catalyst, typically a cobalt salt, is used in these active oxygen scavenging systems. Oxygen scavengers are added to the resin in a range of from about 1 to about 10% by weight (based on the weight of said rein).

It is preferred that the opacifying materials employed with the present invention be added during polymerization, or prepared as a master batch for mixing with the polymer. The polyester pellets may also be coated with the opacifying materials. It is known that polyester containers can be made by first injection molding the polyester resin into a preform, and stretch blow molding the preform into the shape of the container. The master batch of the opacifying material, together with other materials, can optionally be added to the extruder of the injection molding machine. These process steps work well for forming carbonated soft drink water or beer bottles, and hot-fill containers for example. The present invention can be employed in the conventional known stretch-blow-molded processes for producing a polyester container.

TESTING PROCEDURES

Intrinsic viscosity (IV) is determined by dissolving 0.2 grams of an amorphous polymer composition in 20 milliliters of dichloroacetic acid at a temperature of 25° C. and using an Ubbelhode viscometer to determine the relative viscosity (RV). RV is converted to IV using the equation: $IV=[(RV-1)\times 0.691]+0.063$.

Oxygen flux, at zero percent relative humidity, at one atmosphere pressure, and at 25° C. was measured with a Mocon Ox-Tran model 2/20. A mixture of 98% nitrogen with 2% hydrogen was used as the carrier gas, and 100% oxygen was used as the test gas. Prior to testing, specimens were conditioned in nitrogen inside the unit for a minimum of twenty-four hours to remove traces of atmospheric oxygen. The conditioning was continued until a steady base line was obtained where the oxygen flux changed by less than one percent for a thirty-minute cycle. Subsequently, oxygen was introduced to the test cell. A reduction in the amount of oxygen was measured from 0 to at least 350 hours. Treatment of the data generated an Apparent Permeation Coefficient (APC), as a function of time online with oxygen exposure $(cc(STP).cm)/(m^2.atm.day)$. The generated APC data is not a steady state value in normal permeation coefficients. APC is data generated that describes oxygen permeation at a fixed point in time, even though this coefficient is changing slowly with time. These changes are too small to be detected during the time necessary for measuring their value at any fixed point in time. Calculation of the APC was done according to a literature method for permeation coefficients for PET copolymers, from a solution Fick's second law of diffusion with appropriate boundary conditions. The literature documents are: Sekelik et al., *Journal of Polymer Science Part B: Polymer Physics*, 1999, Volume 37, Pages 847-857. The second literature document is Qureshi et al., *Journal of Polymer Science Part B: Polymer Physics*, 2000, Volume 38, Pages 1679-1686. The third literature document is Polyakova, et al., *Journal of Polymer Science Part B: Polymer Physics*, 2001, Volume 39, Pages 1889-1899.

Carbon dioxide permeability of bottles was measured using a MOCON Permatran C-200 $CO_2$ Permeation System. Tests were conducted at 22° C. The bottles were purged with nitrogen and then pressurized with $CO_2$ at a pressure of 60 psi (4.01 MPa). The bottles were left in ambient conditions for 3 days and the pressure measured. Bottles in which the pressure had dropped below 56 psi (3.75 Mpa) were rejected, otherwise the bottles were repressurized to 60 psi (4.01 MPa) and placed in the testing chamber, which has been purged with nitrogen for at least 5 hours. After a day, measurements of the $CO_2$ in the test chamber were taken over a 30 minute time frame, over an eight hour time period. The nitrogen flow rate to the sensor was 100 cm$^3$/min, and to the carrier stream was 460 cm$^3$/min. Results are reported as cm$^3$/bottle/day averaged from at least 4 bottles and 15 readings on each bottle.

Haze was determined with a Hunter Haze meter. Color was measured with a Hunter Color Quest II Instrument using D65 illuminant, 2° observer, and reported as 1976 CEI values of color and brightness, L, a* and b*.

EXAMPLE 1

The control resin was KoSa type 1101. This is a standard resin sold for clear bottle end-uses. This is manufactured on a continuous polymerization reactor, starting with terephthalic acid and ethylene glycol. The recipe also contains 2.4 mole % isophthalic acid and 1.5 weight % diethylene glycol. In addition, 8 ppm of graphite, as a reheat agent, and 140 ppm fumed silica (Cab-O-Sil, Cabot Corporation) as an antislip agent, are included in the recipe. The amorphous resin was solid-stated in a continuous reactor to a final IV of 0.83.

An identical recipe was used to prepare a resin containing 0.32 weight % titanium dioxide ($TiO_2$). This was prepared in a batch pilot scale reactor. The $TiO_2$ (from Sachtleben Company, grade LWSU) was added prior to polycondensation. The amorphous resin was solid-stated in a batch reactor to the same IV as the control resin, namely 0.83. These two resins were processed into two liter bottles employing 48 grams in the preform which were injection molded at a temperature of 282° C. with an Arburg Injection Molding Machine. The preforms were heated to about 110° C. and stretch blow molded in a mold (at room temperature), using a Cincinnati Bottle Machine. These temperatures were chosen to produce clear uniform bottles for the control resin. The same processing was used for the $TiO_2$ containing resin. The control bottle had a haze of 1.5% and the $TiO_2$ containing resin was opaque and had a haze of 85%.

EXAMPLE 2

Aluminum powder from (Siblerline Company Type 330-20E-Silvet) having an average particle size of 10.2 microns was added in various amounts in a polyethylene carrier (80% aluminum) employed in a pellet form. The pellet was blended with the same control resin recipe (KoSa type 1101) as used in Example 1 to prepare polyester containing loadings of 0.16 to 4% by weight. The blend was injection molded and the performs were stretch blow molded under the same conditions as set forth in Example 1 to produce 2 liter bottles.

Even at the lowest levels of 0.16% by weight addition of aluminum powder, the sidewalls of the container (having a thickness of 0.4 mm) completely blocked visible light. The bottles were tested for $CO_2$ and $O_2$ permeation. The results are set forth in Table 1.

TABLE 1

| Sample | Al, wt. % | $CO_2$ Permeation cc/bottle/day | $O_2$ Permeation cc · cm · m$^{-2}$ · atm$^{-1}$ · day$^{-1}$ |
|---|---|---|---|
| Control | 0.00 | 24.5 | 0.173 |
| 1 | 0.16 | 22.9 | 0.165 |

TABLE 1-continued

| Sample | Al, wt. % | $CO_2$ Permeation cc/bottle/day | $O_2$ Permeation cc · cm · m$^{-2}$ · atm$^{-1}$ · day$^{-1}$ |
|---|---|---|---|
| 2 | 0.24 | 20.5 | 0.167 |
| 3 | 0.40 | 20.0 | 0.167 |
| 4 | 0.80 | 19.4 | 0.172 |
| 5 | 2.40 | 19.9 | 0.155 |
| 6 | 4.00 | 19.1 | 0.167 |

This shows that 0.24 wt. % aluminum particles improve $CO_2$ permeation by at least 15%, with no further improvement at higher levels. A 5 to 10% improvement in $O_2$ permeation was also seen at this level.

The color and haze of the 0.4 mm sidewall of the bottles are set forth in Table 2.

TABLE 2

| Sample | Al, wt. % | L* | a* | b* | Haze, % |
|---|---|---|---|---|---|
| Control | 0.00 | 74.98 | −0.58 | 3.63 | 12 |
| 1 | 0.16 | 21.61 | −4.29 | −2.48 | 39 |
| 2 | 0.24 | n.m. | n.m. | n.m. | 100 | n.m. - not measured (sample opaque).

This shows that at 0.24 wt. % aluminum loading the bottle wall has 100% haze (opaque) and will mask any color in the base resin.

Additionally sample 3, containing 0.4 wt. % aluminum particles, was melt filtered through a 5 micron filter to give a clear extrudate (the filter retained the aluminum particles), illustrating that the product can easily be recycled by employing a filter.

EXAMPLE 3

Aluminum powder from (Silvet Company Type 330-20E) having different average particle sizes were added in at a 0.5 wt % level in a PET carrier (80% aluminum) and extruder in a pellet form (0.4 wt. % Al). The pellets were blended with the same control resin recipe (KoSa type 1101) as used in Example 1. The blend was injection molded and that preforms were stretch blow molded to produce 20 ounce (0.59 liter) bottles. The color and haze of the 0.25 mm thick bottle sidewalls were measured, and the results set forth in Table 3.

TABLE 3

| Sample | Al Particle size, micron | L* | a* | b* | Haze, % |
|---|---|---|---|---|---|
| Control | 0.0 | 94.45 | 0.15 | 2.10 | 8.26 |
| 7 | 10.2 | n.m. | n.m. | n.m. | 100 |
| 8 | 25.5 | 28.5 | −0.22 | −0.35 | 79.2 |
| 9 | 50 | 62.6 | 0.09 | 1.27 | 55.2 |
| 10 | 64 | 74.1 | .30 | 2.16 | 40.1 |
| 11 | 83 | 84.0 | .30 | 2.35 | 35.3 | n.m. - not measured (sample opaque)

These results show that, at a fixed loading, the smaller particles give the best covering capability. The $CO_2$ and $O_2$ permeation of these samples were measured and the results are set forth in Table 4.

TABLE 4

| Sample | $CO_2$ Permeation cc/bottle/day | $O_2$ Permeation $cc \cdot cm \cdot m^{-2} \cdot atm^{-1} \cdot day^{-1}$ |
|---|---|---|
| Control | 12.8 | 0.181 |
| 7 | 9.2 | 0.183 |
| 8 | 10.3 | 0.183 |
| 9 | 10.3 | 0.180 |
| 10 | 9.72 | 0.178 |
| 11 | 9.29 | Not measured |

$CO_2$ permeation improved by 20-30% with 0.4 wt. % of Al powder with particle sizes from 10.2 to 83 microns, $O_2$ permeation showed no improvement with Al powder with a size larger than 10 microns.

EXAMPLE 4

Aluminum powder from (Silvet Company Type 330-20E) having an average particle size of 10.2 microns was added at a 0.5 wt. % level in a PET carrier (80% aluminum) extruded in a pellet form. The pellet was blended with the same control resin recipe (KoSa type 1101) as used in Example 1. The blend and the control resin were both injection molded into preforms and the preforms heated in the normal way, through a bank of IR lamps for 12.5 seconds, prior to stretch blow molding. An IR temperature sensor measured the temperature of the preform directly on leaving the IR heating zone and 15 seconds later. The results are set forth in Table 5.

TABLE 5

| Sample | Temperature directly after heating, °C. | Temperature 15 seconds after heating, °C. |
|---|---|---|
| Control | 92 | 72 |
| Control with 0.4 wt. % Al | 147 | 80 |

This shows the value of Al powder as an IR reheat agent to improve the rate of heating preforms which will allow less energy, or increased speed, to obtain the same preform temperature after equilibration for stretch blow molding.

EXAMPLE 5

A polyester homopolymer with no isophthalic acid was prepared and injection molded into preforms. These preforms were hazy. The same resin was blended with the aluminum master batch to give a loading of 0.4% by weight aluminum. The preforms completely mask the haziness and were visually comparable to the preforms of Example 3, sample 7 with 0.4% aluminum. This shows that the injection molding and stretch blow molding processes can be optimized without limitations of haziness. In addition, bottles can be heat set to improve hot fill performance without a concern of haziness due to the thermal crystallization of the bottle.

EXAMPLE 6

Polyamides are known to act as acetaldehyde (AA) scavengers and as a means to improve gas barrier (U.S. Pat. No. 5,258,233), but their concentration is limited, generally to below 2 weight %, due to the formation of a yellow hue. Partially aromatic polyamides with the addition of a transition metal catalyst are also active oxygen scavengers (U.S. Pat. No. 5,021,515), with concentrations in the range of 4-6 wt. % based on resin. The use of a cobalt catalyst is used to mask the yellowness.

The control resin (KoSa type 1101) was blended with 5 wt. % of a partially aromatic polyamide (Mitsubishi Gas Chemical Co., Inc. MXD6 Type 6007) and injection molded and stretch blow molded into 20 ounce (0.59 liter) bottles. A similar bottle was produced with the same level of MXD6, but with 0.4% of the 10.2 micron Al powder. In addition 0.05 weight % of Cobalt octoate was blended with the MXD6. The $CO_2$ and $O_2$ permeation of these bottles is set forth in Table 6.

TABLE 6

| Sample | Al, wt. % | MXD6, wt % | Cobalt Octoate, wt. % | $CO_2$ permeation $cm^3$/bottle/day | $O_2$ Permeation $cc \cdot cm \cdot m^{-2} \cdot atm^{-1} \cdot day^{-1}$ |
|---|---|---|---|---|---|
| Control | 0.0 | 0.0 | 0.0 | 10.9 | 0.181 |
| 12 | 0.4 | 0.0 | 0.0 | 9.2 | 0.183 |
| 13 | 0.0 | 5.0 | 0.0 | 4.7 | 0.083 |
| 14 | 0.0 | 5.0 | 0.05 | 5.5 | 0.003 |
| 15 | 0.4 | 5.0 | 0.05 | 1.88 | 0.130 |

The results show that the combination of Al powder and MXD6 containing cobalt had a synergistic effect on the $CO_2$ permeation of the bottles. The reduction of active oxygen scavenging effect was probably due to a deactivation of the cobalt catalyst by the Al powder, and is not expected with other opacifying agents. The color measurements on the bottles are set forth in Table 7.

TABLE 7

| Bottle | Control | Sample 13 |
|---|---|---|
| a* | 0.1 | 0.1 |
| b* | 0.9 | 4.1 |
| L* | 114 | 111 |
| Haze, % | 1.8 | 11.5 |

The increase in yellowness (b*) and Haze with the addition of the polyamide can obviously be hidden by the addition of an opacifying agent.

EXAMPLE 7

The control KoSa 1100 resin was blended with a masterbatch of fumed silica (Cab-O-Sil, Cabot Corporation) to give a silica loading of 0.5 wt. %. The particle size of the Cab-O-Sil particle size was 0.22 micron. The $CO_2$ permeation was reduced from 9.7 for the control to 3.4 $cm^3$/bottle/day for the silica containing bottle, which had a haze level of 100%.

Thus it is apparent that there has been provided, in accordance with the invention, a product and a process for making that product that fully satisfies the objects, aims, and advantages set forth above. While the invention has been described in conjunction with the specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the present invention.

What is claimed is:

1. A stretch-blow-molded opaque polyester container comprising: a polyester resin containing an aluminum powder opacifying material and an oxygen scavenger, wherein said oxygen scavenger comprises an oxidizable polymer and a transition metal catalyst, and wherein the oxidizable polymer is present in an amount of from 4-6 wt % of said polyester resin, wherein said container has less than 15% transmission of visible light (500 nm) through a 0.4 millimeter thickness.

2. The container of claim 1, wherein said polyester resin contains from about 0.1 to about 5 wt % of said opacifying material.

3. The container of claim 1, wherein said oxygen scavenger is partially aromatic polyamide, whereby said container has a carbon dioxide permeation of less than about half that of a container with just said powdered aluminum or of a container with just said partially aromatic polyamide.

4. The container of claim 1, wherein said polyester resin contains from 0.16 to about 4 wt % of said aluminum powder opacifying material.

5. The container of claim 1, wherein said aluminum powder opacifying material has a particle size of between 10.2 and 83 microns.

6. The container of claim 1, wherein said container exhibits a $CO_2$ permeation that is improved by at least about 15% compared with a container having just polyester resin.

* * * * *